United States Patent [19]
Hettrick

[11] 3,859,448
[45] Jan. 7, 1975

[54] METHOD AND PRODUCT LIQUID MOLASSES WITH DIATOMACEOUS EARTH

[75] Inventor: La Verne A. Hettrick, Carson City, Nev.

[73] Assignee: International Feed Improvement Association, Inc., Castroville, Calif.

[22] Filed: Apr. 25, 1974

[21] Appl. No.: 464,066

Related U.S. Application Data

[63] Continuation of Ser. No. 242,156, April 7, 1972, abandoned.

[52] U.S. Cl. ............... 426/96, 426/103, 426/213, 426/285, 426/807
[51] Int. Cl. ............................................. A23k 1/02
[58] Field of Search ............ 426/96, 103, 147, 213, 426/285; 127/29; 71/64 E, 64 G

[56] References Cited
UNITED STATES PATENTS

| | | |
|---|---|---|
| 3,078,164 | 2/1963 | DeLisle ................................. 99/6 |
| 3,617,298 | 11/1971 | Kohl ..................................... 99/6 |

FOREIGN PATENTS OR APPLICATIONS

| | | |
|---|---|---|
| 1,814,247 | 7/1970 | Germany .............................. 99/6 |
| 6,931 | 5/1901 | Great Britain ........................ 99/6 |

*Primary Examiner*—A. Louis Monacell
*Assistant Examiner*—Curtis C. Ribando
*Attorney, Agent, or Firm*—Kolisch, Hartwell, Dickinson & Stuart

[57] ABSTRACT

A liquid-molasses-containing product, and a method of making the same. The product takes the form of free-flowing granules, each containing a droplet of liquid molasses which is coated with particles of diatomaceous earth. The product is prepared by merging undivided streams of liquid molasses and diatomaceous earth particles, which merging results in the undivided molasses streams breaking up into droplets that become coated by the particles.

2 Claims, 2 Drawing Figures

PATENTED JAN 7 1975          3,859,448

METHOD AND PRODUCT LIQUID MOLASSES WITH DIATOMACEOUS EARTH

This application is a continuation of my prior-filed U.S. Pat. application Ser. No. 242,156, filed Apr. 7, 1972, entitled "Liquid-Molasses-Containing Product and Method", now abandoned.

BACKGROUND AND SUMMARY OF THE INVENTION

This invention pertains to a liquid-molasses-containing product, and to a method of making the same. Molasses is a widely desired nutrient constituent for livestock feeds, as well as for other agricultural products. However, problems have been encountered heretofore in the handling of molasses, and in the blending thereof with other constituents. More specifically, bulk liquid molasses is a tacky, substantially non-drying mass which is difficult to mix uniformly, and without caking and lumping, with other (typically relatively dry) product constituents. Past attempts to take care of these difficulties have been predicated, for the most part, on the assumptions that the relatively high viscosity of molasses, and its essentially nondrying nature, are drawbacks which must be dealt with before the molasses can successfully be mixed with other products. Such prior attempts have, therefore, involved heating to reduce viscosity and/or atomizing to promote drying, prior to introducing molasses into other products. Such procedures, however, almost invariably reduce, and in some cases, significantly injure, the nutritional value of the molasses in the final product.

A general object of the present invention, therefore, is to provide a novel, and an entirely satisfactory, way of embodying molasses, in a form which can easily be handled and blended with other products for a purpose such as that briefly outlined above, and in a manner causing no appreciable damage to its nutritional value.

Contrary to the prior art's treatment of molasses' relatively high viscosity and its nondrying nature as serious drawbacks, the present invention treats these characteristics as decided and important advantages. This will become more fully apparent from the description set forth below.

The novel product proposed by the invention takes the form of free-flowing granules—each granule containing a droplet of liquid molasses which is coated with particles of diatomaceous earth. According to the invention, such a product is prepared by merging, or contacting, undivided streams of liquid molasses and of diatomaceous earth particles. The particles, at the region of contact of the streams, travel sufficiently fast to cause the molasses stream to break up into droplets, which droplets then collect, and become coated by, particles.

DESCRIPTION OF THE DRAWINGS

Further details of the invention, and of its advantages, are described more fully below in conjunction with the accompanying drawings, wherein.

DETAILED DESCRIPTION OF THE INVENTION

Figure 1:
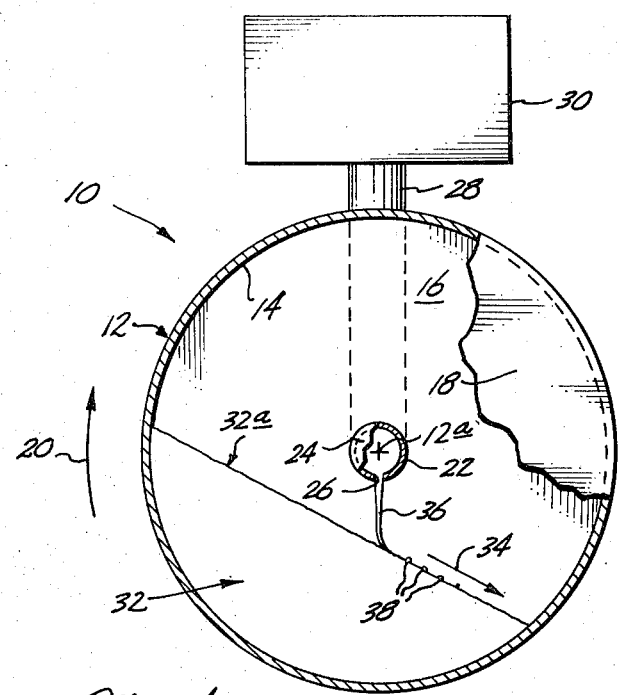
FIG. 1 is a simplified illustration, in side elevation, showing one form of apparatus suitable for practicing the method of the present invention.

Turning now to the drawings, and referring first to FIG. 1, indicated generally at 10 is one form of apparatus suitable for practicing the method of the present invention. Apparatus 10 comprises a hollow drum 12 having a cylindrical wall 14 closed off at axially opposite ends by circular end walls 16, 18. Although the specific size of drum 12 is not critical, the drum shown herein has an inside diameter of about 6 feet, and a length, measured between the confronting faces of walls 16, 18, of about 12 feet. Drum 12 is disposed with its longitudinal axis 12a substantially horizontal. Adjacent its opposite ends, the drum is suitably journaled for rotation about this axis. A suitable power drive means (concealed) is provided for turning the drum in the direction of the arrow 20, and at a speed in the range of about 15 to 20 revolutions per minute.

Extending axially into drum 12 through end wall 16 is an elongated pipe 22, the near end of which in FIG. 1 is disposed within the drum, and is closed off by a cap shown partially at 24. Distributed along the underside of pipe 22, inside drum 12, are a plurality of spaced-apart openings, such as opening 26. Thirty such openings are provided herein. Pipe 22 has an inside diameter of about 1½ inches, and each of openings 26 has a diameter of about three-sixteenths inches. The far end of pipe 22 in FIG. 1, which end protrudes centrally through end wall 16 in the drum, joins with an upright pipe 28 which extends upwardly and connects with a tank 30 disposed above the drum.

According to the invention, a novel freely flowable, granular, liquid-molasses-containing product is to be formed through the novel steps of (1) dividing bulk liquid molasses into droplets, and (2) coating such droplets with particles of diatomaceous earth. More specifically, the invention contemplates the dividing of such molasses through the merging or contacting of streams of liquid molasses and of diatomaceous earth particles, with the latter traveling sufficiently fast in the regions of stream contact to break up the molasses stream into droplets. In particular, it has been found that such breaking up into droplets may readily be accomplished where the travel speed of diatomaceous earth particles in the contact regions exceeds the highest speed at which the stream of molasses in the region can flow cohesively. All of the steps of the above method are conducted at relatively low temperatures, below about 90°F. (at the maximum), and preferably at a temperature in the range of about 40° to 80°F.

Explaining how apparatus 10 may be used to perform the steps just described, drum 10 is partially filled, as indicated at 32, with a quantity of commercially available diatomaceous earth. Such material is normally powder-like in form, typically containing particles having mesh sizes in the range of about 200–400 mesh. A suitable quantity of this material for drum 12 would weigh about 3000 lbs., and would fill about 40% of the volume of the drum.

Drum 12 is then rotated in the direction of arrow 20, and at a speed in the range of speeds mentioned earlier for the drum. Under such circumstances, the mass of particles in the drum assumes an inclined orientation therein, as shown in FIG. 1. More specifically, the mass of particles assumes an attitude with its top surface 32a inclined at an angle greater than the angle of repose of the particles. As a consequence, there results a continuous sheet-like moving stream of particles, generally in the direction of arrow 34, along surface 32a.

Previously mentioned tank 30 is for storing a quantity of bulk liquid molasses. Any conventional molasses may be used, such as black strap, wood, beet, cane, citrus or corn syrup molasses, or others. For the particular operation now being described, tank 30 contains cane molasses. With drum 12 containing particles, and turning as just described, molasses from tank 30 is admitted by gravity through pipe 28 into pipe 22. From pipe 22, such molasses flows by gravity through openings 26 in elongated slender undivided streams which flow down onto the moving stream of diatomaceous earth particles. One of such undivided molasses streams is indicated generally at 36 in FIG. 1.

Under the conditions just described, in the regions where the molasses streams contact the particle stream, the molasses streams break up into droplets which then quickly become coated with particles. Several of such droplets are indicated generally at 38 in FIG. 1. Breaking up of an undivided molasses stream into droplets is facilitated by the fact that in the regions of stream contact, the moving particles of diatomaceous earth, with drum 12 turning in the speed range indicated, travel sufficiently fast to destroy cohesive flow in the molasses stream.

All of the steps just mentioned are performed at a temperature preferably in the range of about 40° to 80°F. A very suitable temperature has been found to be about 65°F.

The operation just described is continued until the quantity of particles originally placed in drum 12 has received and coated substantially all of the molasses which it is capable of handling—in other words, until substantially all of the particles have been used up in coatings on molasses droplets. With drum 12 initially filled with the weight of particles indicated above, about 3150 lbs. of molasses can be handled.

What results from this process is a freely flowable product comprising granules, each granule consisting of a droplet of liquid molasses, with this droplet completely coated with diatomaceous earth particles.

Figure 2:
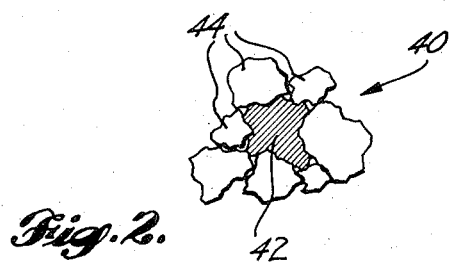
FIG. 2 is a greatly enlarged view, partly in cross section, of one granule of a product formed in accordance with the invention.

Referring to FIG. 2, such a granule is illustrated generally at 40. In granule 40, there is shown, in cross section, a droplet 42 of molasses—this droplet being coated with numerous diatomaceous earth particles, several of which are indicated at 44.

By performing the steps outlined above in the range of relatively low temperatures mentioned, and by avoiding atomizing of molasses, the nutrient value of molasses in the final product is retained. Further, at such low temperatures the characteristic tackiness and high viscosity of molasses is retained, which conditions promote coating of the droplets. With tackiness and high viscosity retained in the final droplets, the droplets cling for long periods of time to their respective particle coatings. Characteristic molasses wetness and stickiness are thus used to advantage.

A further important feature of the invention is that with molasses handled in the temperature range indicated, it has been found to be a simple matter to incorporate sugar in the final coated product—for example by first incorporating sugar granules with the initially dry diatomaceous earth particles. Such sugar granules then, along with the diatomaceous earth particles, become part of the coatings for molasses droplets.

The final product of freely flowable granules can readily be stored in large quantities without attendant caking or lumping. Further, this product can easily be mixed, very uniformly, in the making up of various agricultural blends, such as various livestock feed substances. The coating provided on a droplet, as contemplated herein, not only encapsulates the same in a manner producing free flowability, but also retards any tendency of the droplet to dry out. Thus, the product proposed by the present invention can be stored for use for relatively long periods of time without appreciable loss of nutrient value.

It will be apparent that the steps proposed by the invention are relatively simple, can be performed with relatively simple apparatus, and can be accomplished in various different ways. In other words, rotary drum type apparatus, such as is shown an described herein, is certainly not the only apparatus suitable for practicing these steps.

While a preferred embodiment and method of practicing the invention have been described herein, it will be appreciated that variations and modifications may be made without departing from the spirit of the invention.

It is claimed and desired to secure by Letters Patent:

1. A method of producing a free-flowing, granular, liquid-molasses-containing product comprising
   forming an undivided stream of liquid molasses,
   contacting such stream with a stream of diatomaceous earth particles, with such particles, at the region of contact of said streams, moving at a speed exceeding the highest speed at which molasses in said stream at said region can flow cohesively and without dividing,
   by said contacting, dividing the stream of molasses into droplets, and
   following said dividing, coating such droplets with particles in said stream of particles to form a final product comprising granules, with each granule consisting of a liquid molasses core contained within an adhering coating of diatomaceous earth particles.

2. A freely flowable, granular, liquid-molasses-containing product, wherein each granule consists of
   a droplet of liquid molasses, and
   a coating thereon of diatomaceous earth particles.

* * * * *

UNITED STATES PATENT AND TRADEMARK OFFICE
CERTIFICATE OF CORRECTION

PATENT NO. : 3,859,448
DATED : January 7, 1975
INVENTOR(S) : La Verne A. Hettrick It is certified that error appears in the above-identified patent and that said Letters Patent are hereby corrected as shown below:

Title Page, (Page 1), No. 54, In the title after "PRODUCT", add --OF COATING--

Signed and Sealed this

Fourth Day of April 1978

[SEAL]

Attest:

RUTH C. MASON
*Attesting Officer*

LUTRELLE F. PARKER
*Acting Commissioner of Patents and Trademarks*